Feb. 24, 1942.      R. FITZPATRICK      2,274,055
CABLE STRAIN CLAMP
Filed May 29, 1940
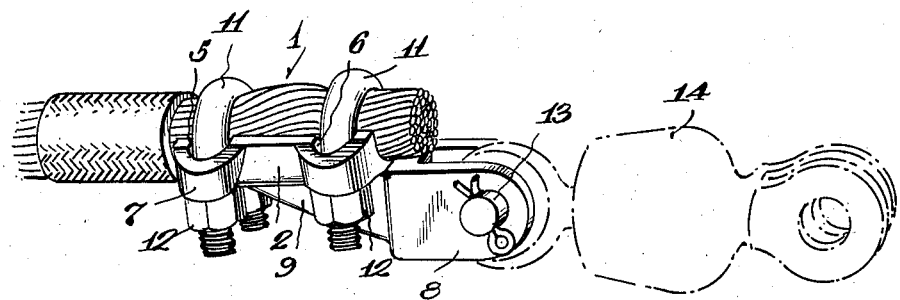
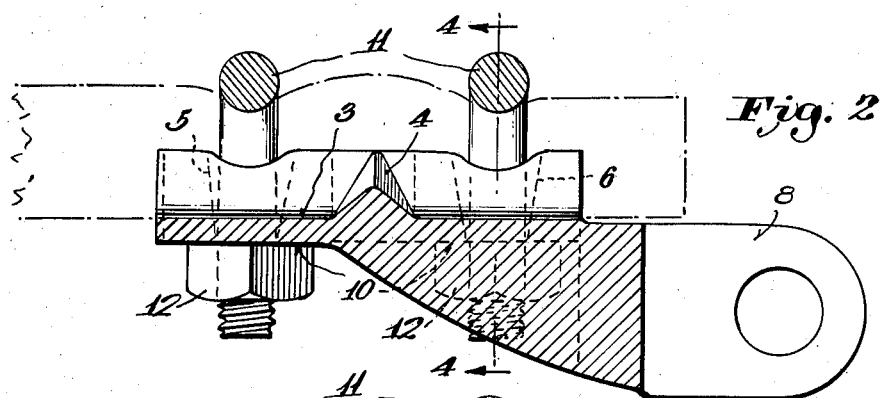
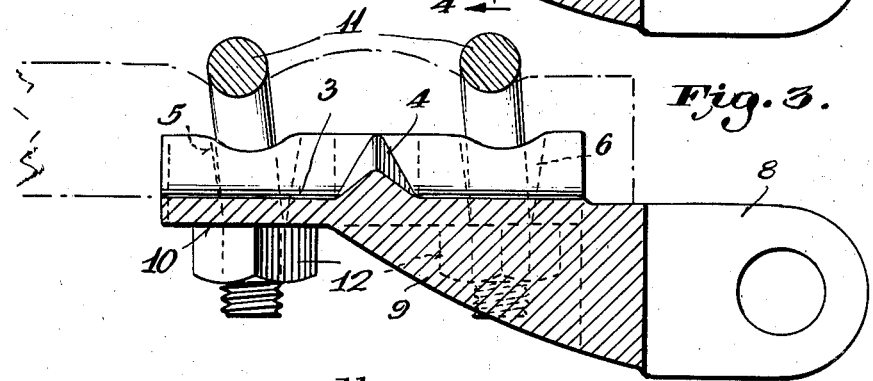
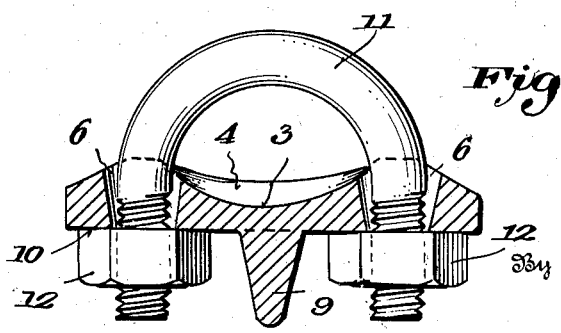
Inventor
Ray Fitzpatrick
By Dyer & Kirchner
Attorneys Patented Feb. 24, 1942

2,274,055

UNITED STATES PATENT OFFICE 2,274,055

CABLE STRAIN CLAMP

Ray Fitzpatrick, East Palestine, Ohio

Application May 29, 1940, Serial No. 337,949

10 Claims. (Cl. 24—125)

My invention relates to cable strain clamps, and more particularly to a device adapted to be fastened to the dead end or a right angle or turn of a heavy wire cable for anchoring the same to a support.

The invention contemplates certain innovations in the structure of the clamp and in its mode of cooperation with the cable for the purpose of providing an exceedingly positive and certain grip, a reduction in manufacturing costs, a simplification of installation procedure, and the provision of a permanently trouble-free connection.

Difficulty has been experienced in the past in providing simple, stout and inexpensive anchorage means for electric transmission and other types of wire cable, particularly those of comparatively large diameter which are subjected to direct pull of high order. The most satisfactory anchorage means in common use relies on a frictional connection with the metal of the cable, and it is of course essential that slippage be prevented. The present invention provides a frictional connection between the cable and the clamp which has withstood slippage under conditions of actual use and under tests involving pulls considerably greater than any which might be expected under conditions of actual use. The clamp is easily and relatively inexpensively produced by familiar metal working operations, and in numerous further respects, the principal of which will be hereinafter noted, is believed to constitute an advance over the best prior art known to me.

The accompanying drawing, illustrating a preferred embodiment of the invention, shows its structure and the manner in which it is connected to a cable or the like for use.

In the drawing:

Figure 1 is a perspective view of a cable strain clamp embodying the invention, shown connected to the dead end of a cable, and including in dotted lines a conventional type of insulating connection secured to the clamp and adapted to be attached to any usual support;

Fig. 2 is a longitudinal vertical section through the clamp showing the relationship of the parts in an initial position, before the application of excessive pulling stress;

Fig. 3 is a similar section showing the relationship of the parts after imposition of excessive pulling stress; and Fig. 4 is a cross sectional view taken along the line 4—4 of Fig. 2.

Referring now to the drawing, the reference numeral 1 designates a conventional type of electrical cable comprising a bundle or wire strands sheathed in a covering of insulation. According to best practice the insulation is removed from the zone of the cable which is to be engaged with the clamp. Of course, uninsulated cable can be anchored also by the clamp, and the clamp is adapted as well to be used for fastening non-metallic cables, ropes, etc.

The clamp comprises a body preferably formed in one piece as a malleable iron casting of sufficient size and stoutness to possess ample strength for the rated conditions of use. What will for convenience of description be regarded as the forward portion of the body has one surface, which may conveniently be considered the upper surface, formed in longitudinal channel shape. The forward portion of the body is designated 2 in the drawing and the floor of the channel is designated 3. To fit all usual sizes of cable and all expected degrees of load, the clamps are provided in a series of sizes, each appropriate to a particular range of cable size, and all stout enough to withstand all expected degrees of load. I find it sufficient to provide the clamp in three sizes, which will take cable throughout the range from 1/0 B. & S. to 1,500,000 circular mils. Preferably the channel in each size is formed with a curvature which is arcuate in cross section to accommodate snugly the cable of largest size which the particular clamp is intended to take.

Transversely across the channel I provide a rib 4 prominently upstanding from the floor of the channel at about the center of its length. A pair of holes are formed in the side walls of the channel fore and aft of the rib. In the drawing the holes of the forward pair are designated 5 and the holes of the rear pair are designated 6. Each of the holes may be formed in an outstanding boss or protuberance 7, which makes the structure adequate in strength without unnecessary addition of metal.

The rear portion of the body of the clamp projects longitudinally, below the level of the floor of the channel, to terminate in a suitable anchorage part, which preferably takes the form of the clevis 8. This clevis or its equivalent is integrally connected with the forward part of the body by a gusset 9 which extends from the bight of the clevis to the bottom of the forward part of the body. As best shown in Fig. 4, this gusset is comparatively narrow and extends along the longitudinal median line of the body, midway between the rear pair of holes 6, and it terminates, as best shown in Figs. 2 and 3, behind the forward pair of holes 5.

Flat seats 10 are formed on the body about the bottom margin of each of the holes. All these seats are aligned in the same plane, which is parallel to the plane of the axis of the channel. The holes are appreciably countersunk from above, or they are enlarged forwardly, so that the U-bolts 11 which are received through these holes from the top will have more clearance from the body in the upper part of each hole than at the bottom of each hole. The object is to permit the bolts to rock forwardly under sufficient forward pull, from the initial position shown in Fig. 2 to the ultimate position shown in Fig. 3. It will of course be appreciated that it is the forward clearance in the top of each hole that is important, rather than the rear clearance In use, a cable such as that shown at 1 is laid in the floor of the channel and its butt may and preferably does extend back over the bight of the clevis. The U-bolts are inserted and nuts 12 are turned up tight on the U-bolts to engage the seats 10. The cable becomes kinked over the rib 4, so that a very secure grip is effected on the cable between the bights of the U-bolts and the floor of the channel.

When extraordinary strain is imposed on the cable there is of course a tendency for the cable to slip. Because the bights of the U-bolts are seated in appreciable valleys or depressions formed in the upper surface of the cable by the kink, the U-bolts tend to move forward with the slipping cable, and this movement is permitted by the clearance resulting from the countersinks. The U-bolts may rock forwardly, resulting in a partial unseating of the nuts 12 from the seats 10, or the U-bolts may bend. In either case the bights of the U-bolts tend to move closer to the floor of the channel, thus materially increasing the grip of the channel and U-bolts on the cable. I find that in actual use a very slight degree of slippage results in an enormous increase in grip, which terminates the slippage and holds the cable.

The clevis may receive a pin 13, holding any desired type of insulator 14 which may be anchored in any way to a support.

The clevis may be as wide as may be required to receive the eye of the insulator, and because the bight of the clevis is located well to the rear of the rear seats 10, and because the gusset 9 is comparatively narrow, there is ample clearance for the application of a wrench to the rear nuts 12.

It is believed that the structure and advantages of the clamp and its mode of use will be clear from the foregoing description. It is recognized that modifications are possible without departure from the spirit of the invention, and all such modifications, to the extent that they embody the principles of the invention as defined by the appended claims are deemed to be within the scope and purview thereof.

I claim:

1. A cable strain clamp comprising a body provided along its upper surface with a cable-receiving longitudinal channel, means for frictionally securing a cable in said channel, an extension portion of the body projecting longitudinally from one end of the channel portion and disposed wholly below the level of the floor of the channel for connecting the clamp to a suitable support, and a gusset portion extending from the under surface of the body and integrally connecting the bottom of the channel portion of the body with the adjacent end of the extension portion.

2. A cable strain clamp comprising a body provided along its upper surface with a cable-receiving longitudinal channel, means for frictionally securing a cable in said channel, an extension portion of the body projecting longitudinally from one end of the channel portion and disposed wholly below the level of the floor of the channel comprising a clevis for connecting the clamp to a suitable support, and a gusset portion extending from the under surface of the body and integrally connecting the bottom of the channel portion of the body with the bight of the clevis.

3. A cable strain clamp comprising a body provided along its upper surface with a cable-receiving longitudinal channel having holes along its opposite longitudinal margins for receiving a U-bolt straddling the cable and frictionally securing the same in said channel, seats formed about the holes on the under side of the body for nuts engaged with the U-bolts, an extension portion of the body projecting longitudinally from one end of the channel portion and disposed wholly below the level of the floor of the channel comprising a clevis for connecting the clamp to a suitable support, and a gusset portion extending from the under surface of the body and integrally connecting the bight of the clevis with the bottom of the channel portion of the body between the seats.

4. A cable strain clamp comprising a body provided along its upper surface with a cable-receiving longitudinal channel having holes along its opposite longitudinal margins for receiving a pair of U-bolts mounted in tandem along the channel each straddling the cable and penetrating said holes so as frictionally to secure the cable in the channel, seats formed about the holes on the under side of the body for nuts engaged with the respective U-bolts, an extension portion of the body projecting longitudinally from one end of the channel portion and disposed wholly below the level of the floor of the channel comprising a clevis adapted to connect the clamp to a suitable support and having a bight spaced from the adjacent seats, and a gusset portion integrally connecting the bight of the clevis with the bottom of the channel portion of the body between and spaced from said last named seats.

5. A cable strain clamp comprising a body provided along one surface with a cable-receiving longitudinal channel having longitudinally spaced pairs of holes formed in the channel side walls for receiving U-bolts arranged in tandem, and a transverse rib upstanding from the floor of the channel between the pairs of holes for cooperating with the U-bolts to kink a cable clamped thereby in the channel, said holes being elongated in a longitudinal direction with relation to the diameter of the legs of the U-bolts whereby the bight portions of the U-bolts may tend to rock forwardly, in the direction of pull on the cable, to tend to move further toward the floor of the channel and further clamp the cable therein.

6. A cable strain clamp comprising a body provided along one surface with a cable-receiving longitudinal channel having a pair of holes formed in the channel side walls for receiving a U-bolt, means at one end of the body for securing the same to a suitable support, and a transverse rib upstanding from the floor of the channel between the holes and the opposite end of the body for cooperating with the U-bolt to kink a cable clamped thereby in the channel, said holes being elongated in a longitudinal direction with relation to the diameter of the legs of the U-bolt whereby the bight portion of the U-bolt may tend to rock toward the rib to further clamp the cable against the rib when the cable is pulled.

7. A cable strain clamp comprising a body provided along one surface with a cable-receiving longitudinal channel having a pair of holes formed in the channel side walls for receiving a U-bolt, means at the rear end of the body for securing the same to a suitable support, a transverse rib upstanding from the floor of the channel between the holes and the forward end of the body for cooperating with the U-bolt to kink a cable clamped thereby in the channel, and seats formed about the holes on the under side of the body for nuts engaged with the U-bolt, said seats being disposed in a common plane which is parallel to that of the axis of the channel, and said holes being countersunk at their upper ends so as to be elongated in a longitudinal direction with relation to the diameter of the legs of the U-bolt, whereby when the nuts are initially tightened the U-bolts will be spaced rearwardly from the forward margins of the countersunk part of the holes and whereby the bight portion of the U-bolt may tend to rock forwardly to further clamp the cable against the rib when the cable is pulled.

8. In a cable strain clamp, a body adapted to be engaged with a cable and having a pair of holes adapted to receive a U-bolt for straddling the cable and clamping the same to the body, and a transverse rib formed on the body forwardly of the holes adapted to cooperate with the U-bolt to kink the cable, said holes being countersunk from the top whereby the bight of the U-bolt may incline forwardly when the cable is pulled to move said bight closer to said rib and thereby increase the grip on the cable.

9. In a cable strain clamp, a body adapted to be engaged with a cable and having a pair of holes adapted to receive a U-bolt for straddling the cable and clamping the same to the body, a transverse rib formed on the body forwardly of the holes adapted to cooperate with the U-bolt to kink the cable, said holes being countersunk from the top, and flat seats formed on the body about the bottom margins of the holes adapted to cooperate with nuts engaged with the U-bolt to position the U-bolt initially centrally in the countersunk parts of the holes whereby the U-bolt may bend forwardly in the countersunk parts of the holes to move the bight of the U-bolt closer to said rib and thereby increase the grip on the cable.

10. A cable strain clamp comprising a body provided along its upper surface with a cable-receiving longitudinal channel having an upstanding rib formed substantially centrally transversely across the channel and having two longitudinally spaced pairs of holes formed in the side walls of the channel, one pair on each opposite side of the rib, said holes being countersunk from the top and being provided with flat seats about their margins on the under side of the body for cooperating with nuts engaged with U-bolts received in the holes and straddling a cable in the channel to position said U-bolts initially centrally in the countersunk portions while permitting the bights of the U-bolts to incline forwardly when the cable is pulled so as to move said bights toward the floor of the channel to increase the grip on the cable, an extension portion longitudinally projecting from the rear end of the body for securing the clamp to a suitable support comprising a clevis disposed wholly below the level of the floor of the channel, and a gusset portion integrally connecting the bight of the clevis with the bottom of the channel portion of the body between the rear pair of seats and terminating short of the forward pair of seats.

RAY FITZPATRICK.